Feb. 28, 1933.  H. S. BROWN ET AL  1,899,308
MINNOW TACKLE BUCKET
Filed June 22, 1931    2 Sheets-Sheet 1
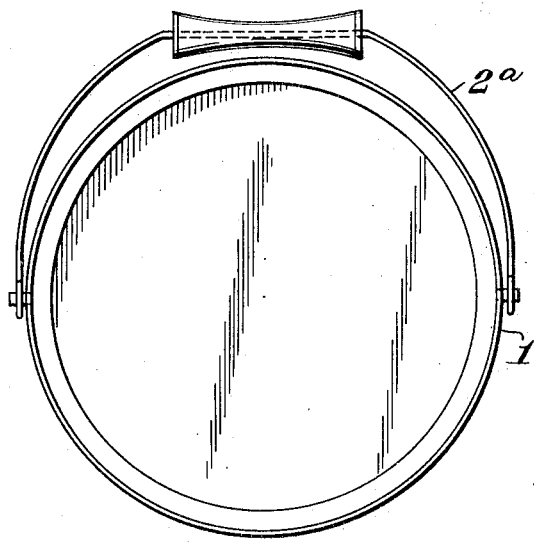
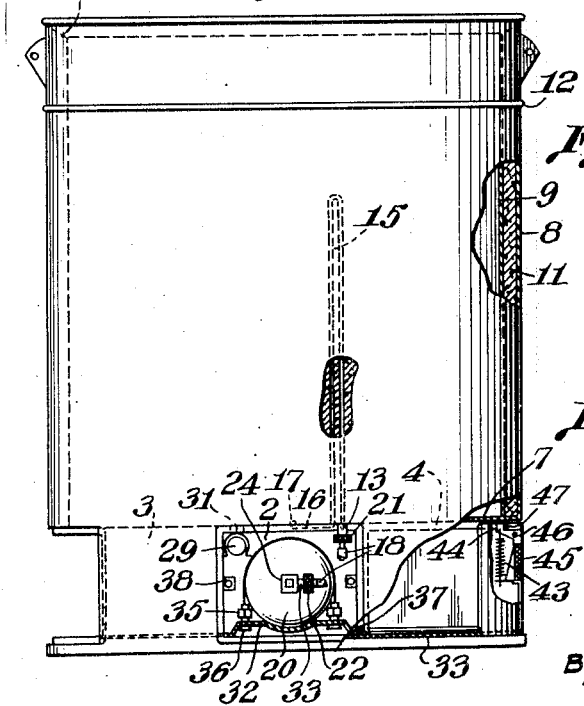
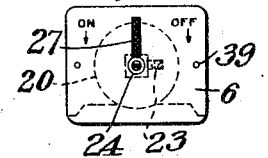
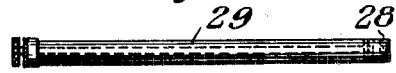
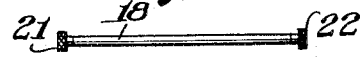
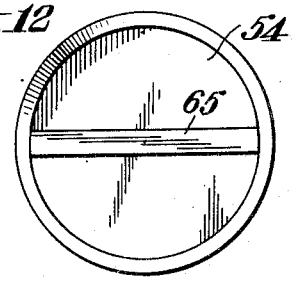
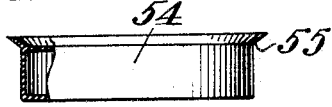
Inventors
Herbert S. Brown
Herbert L. Brown
By
Attorney Feb. 28, 1933.    H. S. BROWN ET AL    1,899,308
MINNOW TACKLE BUCKET
Filed June 22, 1931    2 Sheets-Sheet 2
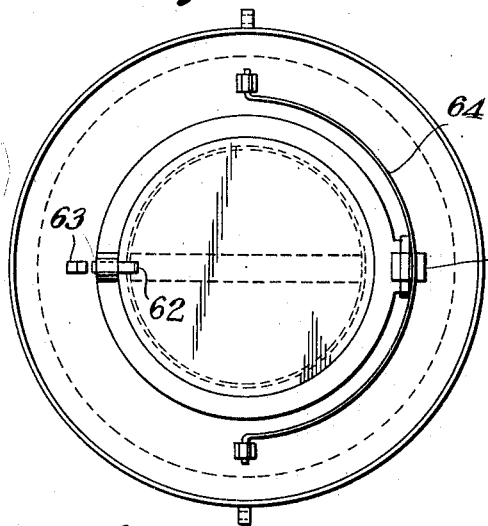
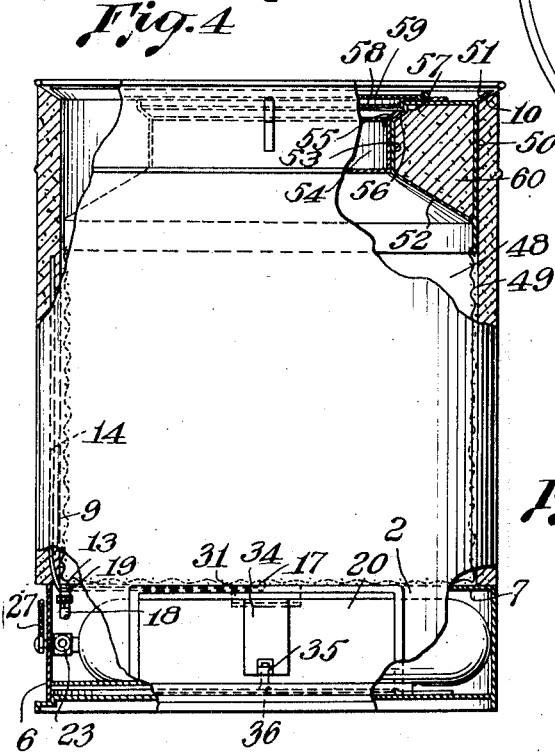
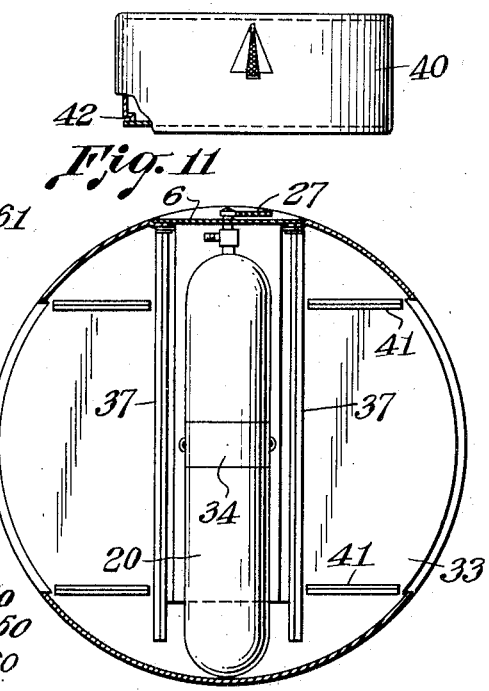
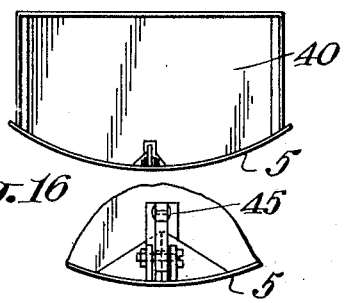
Inventors.
Herbert S. Brown
Herbert L. Brown
By
Attorney Patented Feb. 28, 1933

1,899,308

UNITED STATES PATENT OFFICE

HERBERT S. BROWN AND HERBERT L. BROWN, OF OCEANSIDE, CALIFORNIA

MINNOW TACKLE BUCKET

Application filed June 22, 1931. Serial No. 545,990.

Our invention relates to fishing tackle and particularly to an improvement in minnow buckets.

One of the important objects of our invention is to provide in a device of the above character, an improved minnow bucket having incorporated therein means for preventing water from becoming stale, comprising an oxygen tank provided with a supply line whereby oxygen can be admitted to the water or other liquid content of the vessel to aerate it, thereby aiding in keeping the bait more lively and "peppy" as a means for more skillfully luring fish as a means for enhancing the success of the fisherman.

A paramount object of our invention is to provide in conjunction with a minnow bucket an aerating tank, whereby live bait, such as minnows may be shipped to distant points from hatcheries, or from one aquarium to another for fishing purposes, or for transporting rare fish, frogs, etc. for stocking streams, inland reservoirs, and the like for promoting the productivity of the fish industry.

A further object of our invention is to provide a detachable ice pan whereby the water may be kept cool and likewise the oxygen gas is kept cool and whereby the affinity of the water for the gas is increased.

A further object of our invention is in the provision of an insulated bucket whereby a sub-normal temperature of the water is maintained.

A still further object of our invention is in the incorporation of an inner minnow screen pail within a larger water pail, the head of said screen pail being made heat resistive and buoyant by being packed with cork or other light and non-conducting heat material, said screen pail being detachable for the purpose of placing it in a stream while fishing, to preserve the life of the bait.

A still further object of our invention is the provision of means whereby when the oxygen gas becomes exhausted in the tank, air may be pumped into the tank and it supplied to the water to prevent the latter from becoming stale.

Other features consist of an insulated ice pan lid and cover, and an ice pan which when not used as an ice compartment is useful as a means for storing earthy material and worms, or as a repository for dead or live bait such as crawfish, pickled baits, clams, etc.

There are added features in the structure to be further disclosed, relating to the manner in which the oxygen is let into the water and whereby when the oxygen tube is detached for the purpose of refilling the oxygen tank with gas or air the liquid in the container will be kept from backing up into the oxygen tank container.

Other features of moment consist in the drawers providing a repository for fishing tackle in general, such as reels, hooks, lines, leaders, etc., and yet still other objects and features may hereinafter suggest themselves from those hereinbefore enumerated and especially with the disclosure following when taken in conjunction with the accompanying drawings showing a preferred embodiment of our invention and wherein:

Fig. 1 is a top plan view of a minnow bucket and bail apart from the minnow pail.

Fig. 2 is an elevational view of the device shown in Fig. 1 with the bail removed and some parts removed and broken away to show interior construction thereof.

Fig. 3 is a top plan view of the assembled minnow bucket and minnow pail.

Fig. 4 is an elevational view of the device shown in Fig. 3 some parts being broken away and other parts being shown in section.

Fig. 5 is a front view of the oxygen tank compartment door or front plate and also dottedly shows the relation of the tank and its bed plate therebehind.

Fig. 6 is a longitudinal side elevational view of the auxiliary air pump.

Fig. 7 is a longitudinal side elevation view of an auto inner tube valve stem, with valve core stem inside.

Fig. 8 is a longitudinal side elevational view of rubber hose, which connects the oxygen tank with oxygen supply line.

Fig. 9 is a front view of pump clamp.

Fig. 10 is a transverse mid-sectional view of pump clamp shown in Fig. 9.

Fig. 11 is a transverse section taken through the oxygen tank and drawer compartment with the drawers removed.

Fig. 12 is a top plan view of the ice pan.

Fig. 13 is a side elevational and part mid-sectional view of ice pan shown in Fig. 12.

Fig. 14 is a front elevation of one of the drawers, a part being shown in section to show the construction thereof.

Fig. 15 is a plan view of the drawer shown in Fig. 14, and

Fig. 16 is an enlarged plan view of the drawer handle shown in Fig. 15 and further identified in Fig. 2.

Referring in detail to the drawings, the numeral 1 indicates the minnow bucket and 2a indicates the bail therefor. The lower portion of the bucket is provided with a central tank compartment 2 with transversely extending drawer compartments 3 and 4 on either side.

The drawer fronts 5 are contoured to correspond with the curvature of the bucket proper while the front cover plate 6 for the tank compartment is made flat so as to provide a recess for the oxygen tank control lever later to be described.

The inside bottom 7 of the minnow bucket 1 therefore forms the top of this false bottomwork.

The wall of the bucket 1 is made double, there being an outside wall 8 and an inside wall 9, the upper edge of the inner wall being flared outwardly at 10. Between said walls is packed any desired insulative or non-heat conducting solid 11 such as hair, wool, or ground cork whereby to keep the liquid content cool.

An external circumferential bead 12 circumscribes the bucket 1 near its top edge to serve as a reinforcement therefor.

Into the bottom 7 adjacent the inside wall 9 is fastened a nipple 13 which has its upper end closed. Communicating with the interior of said nipple and formed within its wall is a tube 14 which is directed upwardly into the double wall and back again forming a loop 15, the return bend 16 lying adjacent the bottom side of the bottom 7 and having its discharge orifice 17 enter the central portion of the bottom of the bucket 1.

The top of the loop 15 is normally above the level of the water in the bucket so that water will not flow out of the bucket into the tank compartment 2 after the hose 18 has been detached from the threaded end 19 of the nipple 13 at such time when it is desired to refill the oxygen tank 20.

The hose 18 (Fig. 8) is provided with interchangeable screw heads 21 and 22, the head 21 (in Fig. 2) being screwed onto the threaded end of the nipple 13 and the head 22 being screwed onto the threaded nipple 23, extending outwardly from the valve 24 in the end of the tank 20.

When it is desired to refill the oxygen tank either with oxygen or air, the end 22 of the hose is unscrewed from its nipple and in to this end is screwed the end 25 of the valve 26. The valve handle 27 on the valve 24 of the tank is then opened, after which the hose end 28 of the air pump 29 is screwed on the valve end 30 of the valve 26 and air is forced into the tank to whatever pressure desired. If in close proximity of a gas station the air may be applied simply by affixing the air hose to the valve 26. A similar application is used for refilling with oxygen, the precaution always being exercised by the operator of first closing the valve 24 before unscrewing either the hose of the air pump 29 or the valve 26.

On the outside face of the front plate 6 are arrows indicating the direction for operating the handle 27 whereby the valve 24 may be manually turned "on" and "off".

The auxiliary air pump 29 is detachably secured at the top corner portion of the compartment 2 by means of a clamp 31 positioned at the mid-length of the compartment fastened to the underside of the inside bottom 7. Thus it occupies an obscure position and forms one of the essential tools of the fisherman's kit.

The oxygen tank 20 is supported by a bed plate 32 which is detachably fastened to the outside bottom plate 33 of the minnow bucket 1, and the bed plate is rounded at its mid-width to conform in general with the curvature of the tank and aid in maintaining the relative position of the tank with its bed plate.

At the mid-length of the tank and bed plate is provided a strap band 34. Said band overlies the tank 20 and has a threaded nut 35 at each end into which is screwed from the underside of the bed plate a pair of screws 36 whereby the band is kept taut.

On each side of the bed plate are provided longitudinally extending rails 37 of substantially Z section, one leg of the Z being adapted to be fastened to the outside bottom plate of the minnow bucket while the other flange is adapted to overlie an edge of the bed plate.

It will therefore be obvious the bed plate serves as a cradle whereby the tank and bed plate as a unit may be slidably removed from the compartment in which they are contained for whatever mode of filling, inspection or repairs is necessary.

The side of the bucket 1 is slightly recessed where the front cover plate 6 is applied, being so recessed the control lever 27 will lie flush with the face of the bucket. This construction is clearly shown in elevation and plan in Figs. 4 and 11 respectively. In Figs. 2 and 11 it will also be noted there are two inwardly directed flanges 38 provided with threaded holes which aline with similar holes 39 in the front cover plate 6 and through the latter holes by means of screws screwed into the threaded holes, the cover plate 6 is rigidly secured in place.

Transversely disposed to the compartment and contents are the tackle drawers 40. Said drawers slide in and out from their compartments in a manner similar to that in which the tank and its bed plate slide in and out from their compartment.

To the top side of the outside bottom plate 33 as shown in Fig. 11, are soldered or otherwise secured the Z shaped rails 41, the top flange of said Z occupying the recess 42 provided on each side of the drawers 40.

The fronts of said drawers as stated before are contoured so that the continuity of the bucket rim will be undisturbed.

At the mid-width of said drawers, their outside face is recessed to provide for the attachment of a drawer handle and lock therewith.

Into said recess is seated one end of a compression spring 43, the other end being fastened to the locking end 44 of the drawer handle 45 fulcrumed at 46. Directed downwardly and fastened to the underside of the inside bottom plate 7 is also a locking lug 47 with which the locking end of the handle 45 engages when it has been manually released and after first having been manually depressed to free said lug. The latter construction may be clearly seen in Figs. 2, 14, 15 and 16.

These tackle drawers may be used for whatever purpose deemed advisable. The drawers may be optional at the desire of the purchaser, the minnow bucket being made either with or without them.

Within the confines of the minnow bucket 1, rests the minnow pail 48. The major portion of said pail is foraminated, desirably being made of screen wire of preferred mesh indicated by the numeral 49. The top portion of said pail is made of thin metal gage iron and comprises a peripheral band 50 provided with a flared flange 51 which rests upon the flared edge 10 of the minnow bucket 1. Formed integrally with said peripheral band is another sheet metal section having a tapered wall 52 which forms with the screen element of the pail a truncated portion in which the minnows or bait move about in the water contained in the bucket 1.

The tapered wall 52 terminates into a cylindrical wall 53 of lesser diameter than the bucket 1 and occupying the cylindrical chamber so formed is the ice pan or receptacle 54. The top of the ice pan is flared at 55 to conform with the flared top 56 of the cylindrical chamber on which it rests. Said flared top 56 is in turn extended vertically upwardly to form still another cylindrical recess 57 into which is extended the lower lid portion 58 of the cover 59, the sheet metal comprising the recess 57 finally being directed to meet the intersection of the peripheral band 50 and the flared flange 51, thereby forming an air chamber 60.

The air chamber 60 is filled with any non-heat conducting solids such as, hair, wool, or ground cork, for the purpose of maintaining a lower temperature for the ice whereby it will be prevented from melting.

The ice cools the water to a lower temperature and consequently makes the bait more lively. The liveliness of the bait is also augmented by the emitting of the oxygen from the tank through the orifice 17 into the water.

When it is desired to detach the pail 48 from the bucket and place the pail in a stream or lake the insulated air chamber serves as an adequate float to maintain a buoyant effect of the minnow pail.

The ice pan lid cover formed by the combined elements 58 and 59 may be insulated in a manner as described for the chamber 60 and the double wall of the minnow bucket 1. Said cover is hingedly fastened to the top face of the minnow pail at 61 and has a slidable clasp 62 which lockingly engages with a locking clip 63.

A bail 64 is also provided for the minnow pail, whereby it may be carted independently of the minnow bucket.

The ice pan 54 is provided with a handle 65, the purpose of the ice pan having hereinafter been clearly set forth.

Although the disclosure has been based on a preferred embodiment it is to be understood that the invention is not limited to the particular form of bucket shown, but that changes therein, within the scope of the appended claims, may be made without departing from the spirit of the invention.

We claim:

1. In a minnow bucket, an outer bucket and an inner pail having a screened in lower portion adapted to be contained in said outer bucket, a tank compartment in the bottom end of said outer bucket, and a detachable aerating tank occupying said compartment.

2. In a minnow bucket, an oxygenizing system, comprising in combination with a detachable tank containing an oxygenizing substance, a supply line from said tank extending normally above the liquid level of and within the confines of the wall of said bucket and provided with an orifice terminating in the bottom of said bucket, a valve on said tank for regulating the amount of substance passing through said orifice and control means for regulating said valve.

3. A minnow bucket comprising an outer bucket and an inner screen pail, the wall forming said outer bucket being double and insulated, said inner screen pail being detachable, and having a head provided with an annular air tight chamber, said chamber being provided with means whereby it is made buoyant and heat resistive, an ice pan detachably secured to said head and an insulative cover for said ice pan and said screen pail.

4. A minnow bucket comprising inner and outer pails, the liquid in the outer pail also occupying the inner pail, said outer pail having its walls of double formation and insulatively packed, a double bottom wall formed in said outer bucket, drawer and tank compartments arranged therein, said tank compartment being provided with a detachable tank containing oxygen whereby the liquid in said pails may be aerated, tubing directed upwardly into said double wall and thence downwardly again and terminating in the bottom wall of said outer pail, flexible tube means uniting said tank with said tubing and manually operative means for regulating the supply of oxygen to said pails.

5. In a device of the kind described, in combination, an inner pail and an outer double-walled pail, each of said pails being adapted to be supplied with a common liquid content for the preservation of live bait, a detachable tank carried by said outer pail containing a substance whereby said content may be aerated, supply means comprising a tube of U formation extending substantially to the liquid level of said content contained between the walls of said outer double-walled pail, the orifice of said tube being directed into said outer pail in the bottom thereof, hose means uniting said supply means to said detachable tank, manually controlled means for regulating the supply of said substance from said tank through said hose means and supply means to said liquid content, and temperature reducing means contained in the top of said inner pail against which said aerated substance is directed.

6. A minnow bucket, a double walled outer pail and an insulated head inner pail having a screened in chamber for the repository of live bait, a liquid adapted to be contained in said outer pail to also occupy said inner pail, a tank compartment contained in said outer pail, a tank in said compartment, said tank being applied to means whereby it is manually detachable from said compartment; a nipple in the bottom liquid wall of said outer pail, supply means directed upwardly in to said double wall and thence downwardly again and terminating in the bottom liquid wall aforesaid, activating means carried by said tank, hose means connecting said supply line with said tank and control means for regulating the supply from said tank to said liquid.

7. In a device of the kind described, in combination, an outer liquid-tight pail, an inner pail having a screen wall, said inner pail being removably mountable within said outer pail, the upper portion of said inner pail having an annular body portion filled with a buoyant substance adapted to cause said inner pail to float in a body of water, and said buoyant substance providing heat resistive means for the annular space within said annular body portion, and a receptacle occupying said annular space.

8. In a device of the kind described, in combination, an outer pail having a liquid-tight bottom and sides, an oxygen supply tank located in the lower portion of said outer pail, an inner pail removably fitted within said outer pail within the space above said oxygen tank, said inner pail having openings to maintain communication with the space enclosed by the outer pail, and manually controllable means to conduct a continuous supply of oxygen from said tank to liquid enclosed by both of said pails, said supply of oxygen being conducted from said tank to said liquid by means remotely contained within the structure of said outer pail.

9. In a device of the kind described, in combination, a detachable outer pail having liquid-tight bottom and side portions, an elongated oxygen supply tank located in the bottom portion of said pail and extending diametrically thereacross provided with means whereby it is withdrawable from said outer pail, a foraminated inner pail removably mounted within said outer pail, there being means to supply oxygen from said tank to liquid contained within both of said pails, and a manually operable valve located at one end of said tank and accessible from the outside of said outer pail to control the supply of oxygen from said tank to the liquid.

10. In a device of the kind described, a pail having a door opening in the lower portion of the side wall thereof, a detachable oxygen supply tank for insertion and removal through said door opening, a cover for said door opening, a valve to regulate the supply of oxygen from said tank to the contents of said pail, and means to operate said valve, said means projecting through said cover, and being manualy accessible exteriorly thereof.

11. In a device of the kind described, in combination, an outer pail having liquid-tight bottom and side portions, an elongated oxygen supply tank detachably located in the bottom portion of said pail and extending diametrically thereacross, a foraminated inner pail removably mounted within said outer pail in the space above said tank, there being manually controllable means to supply oxygen from said tank to the liquid contained within both of said pails, there being a door opening in the lower portion of the wall of the outer pail to provide for the insertion and removal of said tank, and means to secure said tank in the inserted position.

12. In a device of the kind described, in combination, an outer liquid containing pail having a false bottom, an inner screen pail removably mountable in said outer pail above said false bottom, a detachable oxygen supply tank below said false bottom of said outer pail, and means to manually regulate the supply of oxygen from said tank to the interior of said pails, said means being manually accessible from the exterior of said outer pail when the inner pail is in place therein.

13. In a device of the kind described, in combination, an outer liquid containing pail having a false bottom, an inner screen pail removably mountable in said outer pail above said false bottom, a detachable oxygen supply tank below said false bottom of said outer pail, and means to manually regulate the supply of oxygen from said tank to the interior of said pails, said means being manually accessible from the exterior of said outer pail when the inner pail is in place therein, said tank being securable to a bed plate which is detachable therewith.

14. In a device of the kind described, in combination, a double-walled outer pail having liquid-tight bottom and side portions, an elongated oxygen supply tank detachably located in the bottom portion of said outer pail and extending diametrically thereacross, a foraminated inner pail removably mounted within said outer pail, and an oxygen delivery pipe in the double wall of said outer pail leading from said tank up to a point adjacent to the intended water level in said pails and thence down to the bottom portion of the inner pail to discharge below the water body within the pails.

15. In a device of the kind described, in combination, a double-walled outer pail having liquid-tight bottom and side portions, an elongated oxygen supply tank detachably located in the bottom portion of said outer pail and extending diametrically thereacross, a foraminated inner pail removably mounted within said outer pail, there being spaces for drawers below said false bottom at the sides of said tank, and oppositely withdrawable drawers located within said spaces.

16. In a device of the kind described, in combination, a double-walled outer pail having liquid-tight bottom and side portions, an elongated oxygen supply tank detachably located in the bottom portion of said pail and extending diametrically thereacross, a foraminated inner pail removably mounted within said outer pail, there being means to supply oxygen from said tank to liquid contained within both of said pails within the confines of the pail, and a flexible tube providing a loose connection for detachably withdrawing said oxygen tank uniting said means and said tank.

17. In a device of the kind described, in combination, an inner screen pail and an outer liquid containing pail, an aerating tank located in the bottom portion of said outer pail, said outer pail being provided with a double wall and means contained in said double wall connectable with said tank thru which the aerating supply from said tank to the substance common to each pail is conducted and means for manually regulating the supply from said tank to said substance.

HERBERT S. BROWN.
    HERBERT L. BROWN.